United States Patent
Elling-Andersen et al.

(10) Patent No.: US 12,236,437 B2
(45) Date of Patent: Feb. 25, 2025

(54) SYSTEM AND A METHOD FOR IDENTIFYING AN ARTICLE AND WHETHER AN OWNERSHIP OF SAID ARTICLE EXISTS

(71) Applicant: VALUEREG ApS, Stubbekøbing (DK)

(72) Inventors: Michael Bøs Elling-Andersen, Stubbekøbing (DK); Henrik Søndermark Findsen, Gislev (DK); Jan Sander Sandison, Langeskov (DK)

(73) Assignee: VALUEREG ApS, Stubbekøbing (DK)

( * ) Notice: Subject to any disclaimer, the term of this patent is extended or adjusted under 35 U.S.C. 154(b) by 86 days.

(21) Appl. No.: 17/429,587

(22) PCT Filed: Feb. 11, 2020

(86) PCT No.: PCT/DK2020/050036
§ 371 (c)(1),
(2) Date: Aug. 9, 2021

(87) PCT Pub. No.: WO2020/164675
PCT Pub. Date: Aug. 20, 2020

(65) Prior Publication Data
US 2022/0076277 A1    Mar. 10, 2022

(30) Foreign Application Priority Data
Feb. 15, 2019 (DK) .......................... PA 2019 70103

(51) Int. Cl.
*G06Q 30/018* (2023.01)
*G06F 16/23* (2019.01)

(52) U.S. Cl.
CPC ..... *G06Q 30/0185* (2013.01); *G06F 16/2358* (2019.01)

(58) Field of Classification Search
None
See application file for complete search history.

(56) References Cited

U.S. PATENT DOCUMENTS 8,941,469 B1 * 1/2015 Diorio ................ G06Q 30/0185
340/10.5
9,256,881 B2 2/2016 Engels et al.
(Continued)

FOREIGN PATENT DOCUMENTS

EP         2306377 A1 * 4/2011 ............. G06Q 10/08
WO    2009073579        6/2009
(Continued)

*Primary Examiner* — Andrew B Whitaker
(74) *Attorney, Agent, or Firm* — Fox Rothschild LLP; Carol E. Thorstad-Forsyth

(57) ABSTRACT

A system for identifying an article (1) and whether there is an ownership of the article, the system comprising at least one article comprising a first tagging device (4) embedded in the at least one article and a second tagging device (5) embedded in or attached to the at least one article, at least one reading device (2), a central data processing device (3) comprising a storage device with a central database (15) stored thereon and a first transmitting/receiving device (8), and a second transmitting/receiving device (9), where the central database (15) at least comprises a virtual ID (19), the at least one virtual ID (19) comprising an owner profile, a public key, an identification master (IDmaster) code (13) and an identification slave (IDslave) code (14) being centrally generated and information regarding the article, where the first tagging device (4) comprises a tagging device ID (17), the public key and the IDmaster code (13) and is locked in a read-only mode, where the second tagging device (5) comprises a tagging device ID (18) and the IDslave code (14) and is locked in a read-only mode, and where the IDmaster code (13) and the IDslave code (14) are paired and locked to one another thus linking the ownership of the at least one article to the IDmaster code (13) and the IDslave code (14). A corresponding method as well as a method for transferring ownership of an article (1) is also provided.

20 Claims, 6 Drawing Sheets

(56) References Cited

U.S. PATENT DOCUMENTS

| | | | |
|---|---|---|---|
| 2005/0001719 A1 | 1/2005 | Aupperle et al. | |
| 2005/0289061 A1* | 12/2005 | Kulakowski | G06Q 99/00 |
| | | | 705/50 |
| 2006/0011721 A1 | 1/2006 | Olsen et al. | |
| 2006/0055538 A1 | 3/2006 | Ritter | |
| 2007/0180248 A1* | 8/2007 | Gorostidi | G07F 7/122 |
| | | | 713/176 |
| 2015/0134552 A1* | 5/2015 | Engels | G06Q 10/087 |
| | | | 705/318 |
| 2015/0137948 A1 | 5/2015 | Yap et al. | |
| 2016/0098723 A1* | 4/2016 | Feeney | G06Q 20/065 |
| | | | 705/75 |
| 2016/0140574 A1* | 5/2016 | Pacotto | G06Q 30/0185 |
| | | | 705/318 |
| 2016/0189134 A1* | 6/2016 | Voege | G06F 21/35 |
| | | | 705/44 |
| 2016/0296810 A1 | 10/2016 | Mandel et al. | |
| 2016/0358187 A1 | 12/2016 | Radocchia et al. | |
| 2019/0034940 A1* | 1/2019 | Tamba | G06Q 10/0833 |
| 2019/0340623 A1* | 11/2019 | Rivkind | G06F 21/31 |

FOREIGN PATENT DOCUMENTS

| | | |
|---|---|---|
| WO | 2012163922 | 12/2012 |
| WO | 2016035012 | 3/2016 |
| WO | 2019016602 | 1/2019 |

\* cited by examiner

SYSTEM AND A METHOD FOR IDENTIFYING AN ARTICLE AND WHETHER AN OWNERSHIP OF SAID ARTICLE EXISTS

CROSS-REFERENCE TO RELATED APPLICATIONS

The present application is a U.S. National Phase of International Patent Application No. PCT/DK2020/050036 which was filed on Feb. 11, 2020 and claims priority to Danish Patent Application No. PA 2019 70103 which was filed on Feb. 15, 2019. The contents of the listed patent documents are incorporated herein by reference in their entireties.

TECHNICAL FIELD OF THE INVENTION

The present invention relates to a system for identifying an article and whether an ownership of said article exists. The present invention further relates to a method for identifying an article and whether an ownership of said article exists, and furthermore for transferring an ownership of an article from a current owner to a future owner.

Definitions

The following list defines the intended meaning of a number of terms as used in the present application.

Article: Any article which an owner may find it interesting and worthwhile to register in a database with the aim of preventing fraud and/or theft, whether the article is of commercial value or of sentimental value or both. Nonlimiting examples are designer furniture, art objects, designer clothes, historical artefacts and the like.

Central database: A database that is stored in a storage device of the central data processing device. Thus, both the storage device and the central database are inherently central in the same sense as the central data processing device.

Central data processing device: A data processing device when visualised as a part of a network of components is central or remote as compared to the remaining components and to which these components refer, the components in practice being those of a system according to the invention, and in particular the article or articles provided with a first and a second tagging device. May also be denoted "remote data processing device".

Data set: Combination of a set of data put together and stored and/or embedded in a write protected tag.

Embedded: An embedded tag is placed such as to be completely enclosed by a part of an article, for instance by being built into or cast or molded into the material of the article.

NFC: Near Field Communication.

Owner: Owner of an article which is or is to be tagged and registered in the central database. An owner is also denoted first user.

Ownership: An ownership denotes the relation between an article comprising a first tagging device with a first data set and a second tagging device with a second data set and an owner of this article.

Ownership Transfer ID: Unique ID which is used in transferring ownership of an article, and in particular to receive ownerships. The ownership transfer ID is associated with a user profile.

Ownership Transfer forwarding: A process where a user forwards an ownership of an article from one user to another user, wherein the user forwarding the ownership does not obtain an ownership of the article in the forwarding process.

Ownership Transfer process: The process of making a transfer.

Ownership Transfer reference: Reference used in the creation of a virtual space, in which exchange of an ownership can be performed.

Pairing: Process in which two tags are paired by coupling gateways of the respective tags to one another.

Permalock: Technical process by which the data of a tag is locked such as to be read only on a permanent basis.

Portal: A technical platform, such as but not limited to an app, a browser or an integration, configured to enable access on a certain level to the central database, and thus comprising a transmitting/receiving device.

Process lock: A term used herein to denote that part of a process or method is locked such that the result of already performed process or method steps can no longer be altered or changed.

Product ID: A unique numerical ID for an article registered in and validated by the central database. The manufacturer of the article creates the product ID.

Public Key: A code used as a public key during communication with and/or within the system according to the invention. A public key is a suitable code, which identifies any one of the manufacturer of the article, the manufacturer of the first tagging device or the manager of the central database.

Public Standard: A standard being used to create a data set according to the invention in a way ensuring the same procedure is followed each and every time a data set is created.

RFID: Radio Frequency Identification.

Second user: In an ownership transfer interaction, the party to which the owner or first user desires to transfer the ownership of an article of value. Also denoted "future owner".

Tagging device: A chip comprising programmable and externally readable properties. Nonlimiting examples are RFID tags, NFC tags, bar codes, smart codes and the like. Also denoted tag.

Tag Identification: In short TID. A code, serial number or the like identifying a specific tagging device. A TID is provided on every tagging device. The manufacturer of a tagging device creates the corresponding TID.

Transfer: The transfer of an ownership of an article from an owner or first user to a second user or future owner.

User profile: The virtual profile of a user determining the system-based access and permissions of a user.

User: In a broad sense a player having access on a certain user level, and thus not administrator level, to the central database. Users include but are not limited to owners, future owners, third parties, manufacturers, retailers, middle men and partners to one or more thereof.

Virtual connection: A connection between a first user and a second user through the remote data processing unit.

Virtual Identity: Also denoted Virtual ID. A data set, which construes the virtual identity of an article, and which is stored in the central database.

Virtual Space: A space created by the virtual connections and enabling exchange of ownerships between users.

BACKGROUND OF THE INVENTION

During the later years, there has been a great increase in products being counterfeited, copied, fenced and/or stolen. Consequently, counterfeited products, copied products and not least stolen and fenced products have become an ever increasing issue causing an ever increasing amount of problems for manufacturers, resellers, consumers and authorities such as the police and customs, alike. These problems include for instance:

manufacturers and resellers incurring increasing costs due to loss of profit caused by sales of counterfeited products, manufacturers, resellers and authorities spending an increasing amount of time and costs on fighting the problems rather than creating more profit, authorities, such as police and customs, and insurance companies, having an increasing need for manpower and associated increased costs to fight counterfeiters and fencers rather than or in addition to other crimes, and end users experiencing an increasing lack of security both in terms of counterfeit products often being of inferior quality right down to being directly dangerous and in terms of having more difficulties in knowing whether a desired secondhand product is in fact fenced or non-original.

Many attempts have been made to alleviate the above and other related problems. Tagging articles with for instance bar codes or serial numbers and enabling consumers buying such an article to register the serial number on the manufacturer's website is one such solution.

WO 2016/035012 A1 describes a system and a method for preventing counterfeit products. The system comprises a tag attachable to an article, such that the article may be scanned by means of e.g. a telephone, such as to enable validating the article through an external IT infrastructure. The tag comprises data consisting of a fixed code and a variable code. The variable code may be changed or amended by in principle any user.

US 2015/0134552 A1 describes a system for controlling and verifying ownerships of articles. The system comprises one or two uniquely coded identifying tags attachable to an article, such that the article may be scanned by means of a reader, such as to enable verifying the ownership. The reader may then communicate with a central database in which data regarding the article is stored. The owner may transfer the ownership, and any third party, such as a future owner, may request transfer of an ownership. In other words, ownership of an article may be achieved in a number of different ways, where the future owner takes the initiative to become the owner of an article. US 2016/0296810 A1 describes a system being very similar to that of US 2015/0134552 A1, in which system a tag may comprise uniquely coded identifying data (UID), item information, cryptographic signature and a time stamp, and in which system the possibility of using several tags are described in that the tags may be linked by including data from the first tagging device in the second tagging device.

However, none of these solutions have, so far, proved satisfactorily effective in hindering counterfeits or copies, nor in verifying whether a second-hand article is in fact a stolen or fenced article.

Also, a further problem with such systems lies in the ever increasing risk of the system getting hacked and the information, especially the personally sensitive information, stored in the system thus getting compromised or falling in the hands of people with ill intent. The abovementioned attempted solutions are all vulnerable in this regard.

Hence, there is a need for a system and a method which alleviates or eliminates some or even all of the above problems, which effectively hinders counterfeits and copies, and with which the ownership of an article may be verified in an easy manner to enable verifying whether a second-hand article is in fact a fenced or stolen article.

Furthermore, there is a need for a system and a method which also enables achieving the above in a significantly simpler, faster and more secure manner.

Finally, there is a need for a system and a method which also enables achieving the above in a manner reducing or eliminating the risk of theft of information from the system and thus increasing user and consumer protection.

SUMMARY OF THE INVENTION

It is an object of the present invention to overcome these problems, and to provide a system and a method which alleviates or eliminates the above problems, which effectively hinders counterfeits and copies, and with which the ownership of an article may be verified in an easy manner to enable verifying whether a second-hand article is in fact a fenced or stolen article.

Further objects of the invention include providing a system and a method which enables achieving the above object in a significantly simpler, faster and more secure manner, and which also enables achieving the above objects in a manner reducing or eliminating the risk of theft of information from the system.

According to a first aspect of the invention, this and other objects are achieved by means of a system for identifying an article and whether there is an ownership of the article, the system comprising at least one article comprising a first tagging device embedded in the at least one article and a second tagging device embedded in or attached to the at least one article, at least one reading device configured to read at least one of the first tagging device and the second tagging device, a central data processing device comprising a storage device with a central database stored thereon and a first transmitting/receiving device, and a second transmitting/receiving device associated with the at least one reading device and configured to transmit data to and receive data from the at least one reading device and the first transmitting/receiving device, where the central database comprises at least one virtual identity (virtual ID), the at least one virtual ID comprising an owner profile, a public key, an identification master (IDmaster) code, an identification slave (IDslave) code and information regarding the article, the owner profile comprising information regarding an ownership of the article, where the IDmaster code and the IDslave code are generated by the central data processing device, where the first tagging device comprises a first data set stored thereon, the first data set comprising at least the information regarding the at least one article, the public key, a first tag identification (TID) and the identification master (IDmaster) code, the first tagging device being locked in a read-only mode, where the second tagging device comprises a second data set stored thereon, the second data set comprising at least the IDslave code and a second tag identification (TID), the second tagging device being locked in a read-only mode, and where the IDmaster code and the IDslave code are paired and locked to one another by the central data processing device in a process initiated by an owner of both the at least one article and the virtual ID and linking the ownership of the at least one article to the IDmaster code and the IDslave code.

Thereby, a system is provided which alleviates or eliminates the above problems, which effectively hinders counterfeits and copies, and with which the ownership of an article may be verified in an easy manner to enable verifying whether a secondhand article is in fact a fenced or stolen article.

By generating the IDmaster code and the IDslave code by the central data processing device, a system in which the IDmaster code and the IDslave codes are exclusively generated, controlled and assigned centrally in the central database and by the central data processing device is provided for. Thereby a system is provided with which the IDslave code and IDmaster code cannot be copied or otherwise tampered with without the system being able to detect that this is the case. This provides for a system which effectively enables detection of and possibly even hinders counterfeit and/or copied products.

By providing the system with a first tagging device embedded in the at least one article and a second tagging device embedded in or attached to the at least one article, and by further locking both the first tagging device and the second tagging device in a read-only mode, it is ensured that the data stored on the two tagging devices cannot be tampered with without destroying or at least rendering useless the tagging device. Thereby, a very secure system with a high degree of data control and with which the risk of theft of information, and in particular personally sensitive information, from the system is reduced considerably or even eliminated is provided for.

Furthermore, the first tagging device and/or the second tagging device may thereby be used by all different parties in the supply chain, i.e. the various users involved with a thus tagged article during its lifetime, for various purposes and parts of such purposes. Such purposes include, but are not limited to, logistics, supply chain management, validating authenticity of the article, documenting ownership, insurance and so forth. This provides for a significant simplification not only of the system as compared to prior art systems, but also of the use of the system for these and other similar purposes, which in turn provides for a significant saving of time and costs for the various users. For instance, police, customs, insurance agents, resellers, such as auction houses, and interested buyers may in a very simple, fast and straight forward manner, by simply scanning the first tagging device or the second tagging device and communicating with the central data processing device and the central database based on the thus scanned data, immediately and on the spot verify whether the article scanned is stolen, fenced or insured, possibly even without the alleged owner knowing so. Thereby, time and costs involved in, for instance, police work, customs work and the like may be reduced considerably.

By pairing in a unique manner and locking to each other the IDmaster code and the IDslave code by means of the central data processing device in a process initiated by an owner of both the at least one article and the virtual ID, an ownership of the article identified by the thus paired IDmaster code and the IDslave code is generated in the central database, but not written to the tagging devices. Furthermore, it is ensured that first tagging device and the second tagging device remain locked to one another even if one of the tagging devices are removed from the article. Thereby, further levels of security are added to the system.

Furthermore, by providing that the first data set comprises at least the information regarding the at least one article, the public key, a first TID and the IDmaster code, and that the second data set comprising at least the IDslave code and a second TID, it is ensured that information regarding the ownership and the owner, with the possible exception of the initial or very first owner at least if being identical to the manufacturer, is at no point stored in the tagging devices. This guarantees the owner to remain anonymous to other parties scanning either of the tagging devices and communicating with the central database. Thus, an increased user and consumer protection is also provided.

In an embodiment the system comprises a plurality of articles, each article of said plurality of articles comprising a first tagging device embedded in the article and a second tagging device embedded in or attached to the article, where, for each article of said plurality of articles:

the central database comprises at least one virtual ID, the at least one virtual ID comprising an owner profile, a public key, an identification master (IDmaster) code, an identification slave (IDslave) code and information regarding the article, the owner profile comprising information regarding an ownership of the article, the IDmaster code and the IDslave code are generated by the central data processing device, the first tagging device comprises a first data set stored thereon, the first data set comprising at least the information regarding the at least one article, the public key, a first TID and the identification master (IDmaster) code, the first tagging device being locked in a read-only mode, the second tagging device comprises a second data set stored thereon, the second data set comprising at least the IDslave code and a second TID, the second tagging device being locked in a read-only mode, and the IDmaster code and the IDslave code are paired and locked to one another by the central data processing device in a process initiated by an owner of both the at least one article and the virtual ID and linking the ownership of the at least one article to the IDmaster code and the IDslave code.

Thereby, the abovementioned advantages may be obtained for a plurality of articles, and in principle as many as may be needed, using only one system. This involves a further time and cost saving in that interested users or parties only need to communicate with one central database irrespective of which article is scanned. Also, an additional advantage is provided to users, such as in particular manufacturers and resellers, having the need for keeping track of large numbers of articles, e.g. for production management purposes, in that such a system enables such tracking in a very simple and efficient manner.

In an embodiment only the owner of both the at least one article, or an article of said plurality of articles, and the Virtual ID may initiate transfer of the ownership of that article to a second entity, where such a transfer is initiated by scanning the first tagging device or the second tagging device by means of the at least one reading device and sending data comprising the IDslave code or the IDmaster code and a request to start a process for transferring the ownership to the central data processing device by means of the second transmitting/receiving device.

Thereby, the owner continues to remain anonymous to other parties scanning the tagged device and communicating with the central database, even during the transfer of an ownership, and no information regarding the new owner is stored in the tagging devices. Also, it is thereby guaranteed that other parties or users cannot transfer the ownership of an article which they do not own, thus providing the system with another level of security.

In an embodiment information regarding an ownership of the at least one article, or of said plurality of articles, is written only in the central database.

Thereby, it is guaranteed that the owner may at any time remain anonymous to other parties scanning the tagged device and communicating with the central database.

In an embodiment the central data processing device is controlled and operated by a central operator. Alternatively, or additionally, the central data processing device or at least the information stored in the central database is encrypted.

Thereby, an even more secure system with an even higher degree of data control and data security is provided, with which system the risk of theft of information, and in particular personally sensitive information, from the system is reduced considerably or even eliminated is provided for. It is furthermore possible from time to time altering the manner, in which the central data processing device or at least the information stored in the central database is encrypted, thereby adding an even further layer of security to the system.

In an embodiment the first tagging device is locked in a read-only mode prior to being embedded in the article, and/or where the second tagging device is locked in a read-only mode prior to being embedded in or attached to the article.

This has the advantage of enabling a central system operator or tagging device manufacturer to ensure, even before tagging an article, that the data stored on the two tagging devices cannot be tampered with without destroying or at least rendering useless the tagging device. Thereby, further levels of security are added to the system.

In an embodiment the IDslave code and/or the IDmaster code is configured to function as a password to access information stored in the central database regarding the associated article on an access level depending on the user's relationship to the associated article.

Thereby, further levels of security, both as regards the anonymity of various users and the data security, are added to the system in that it becomes possible to, for instance, allow only the owner access to his details as stored in his user profile in the central database.

The first tagging device may be a RFID tag and the second tagging device may be a NFC tag. Alternatively, the second tagging device may be a bar code, a smart code or the like.

Thereby, a particularly simple, cheap and well-functioning system is provided for.

In an embodiment the at least one reading device and the second transmitting/receiving device are integrated in one and the same device.

Thereby, a further simplification of the system is provided for. It is noted that there may be provided two reading devices, one configured to read RFID tags and one configured to read NFC or similar tags, and that these two reading devices may be separate devices or one common device. Furthermore, where two reading devices are provided, they may be associated with separate second transmitting/receiving devices or with one common second transmitting/receiving device.

In an embodiment the reading device is a NFC scanner and the second transmitting/receiving device is a mobile telephone or a tablet or a laptop computer.

Thereby use of the system by means of electronic devices available to by far most persons, and thus parties or users, is enabled. Also, this provides for a particularly simple, cheap and user-friendly system.

In an embodiment the reading device and the first transmitting/receiving device are controlled via and/or integrated in an app, the app being installed on a data processing device, such as a mobile telephone or a tablet or a laptop computer.

This provides for a particularly simple, cheap and user-friendly system, which is also particularly fast to use.

In a second aspect of the invention the above and other objects are achieved by means of a method for identifying an article and whether there is an ownership of the article, the method comprising the steps of:

a) providing a system according to the first aspect of the invention,
b) scanning, by means of the at least one reading device, at least one of the first tagging device and the second tagging device,
c) obtaining, from the central database, information stored in the central database regarding the article and information stored in the central database regarding an ownership of the article, and
d) displaying the obtained information regarding the article and information regarding an ownership of the article.

It is noted that the invention relates to all possible combinations of features recited in the claims.

SHORT DESCRIPTION OF THE DRAWINGS

This and other aspects of the present invention will now be described in more detail, referring to the appended drawings showing embodiment(s) of the invention.

DETAILED DESCRIPTION

The present invention will now be described more fully hereinafter referring to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
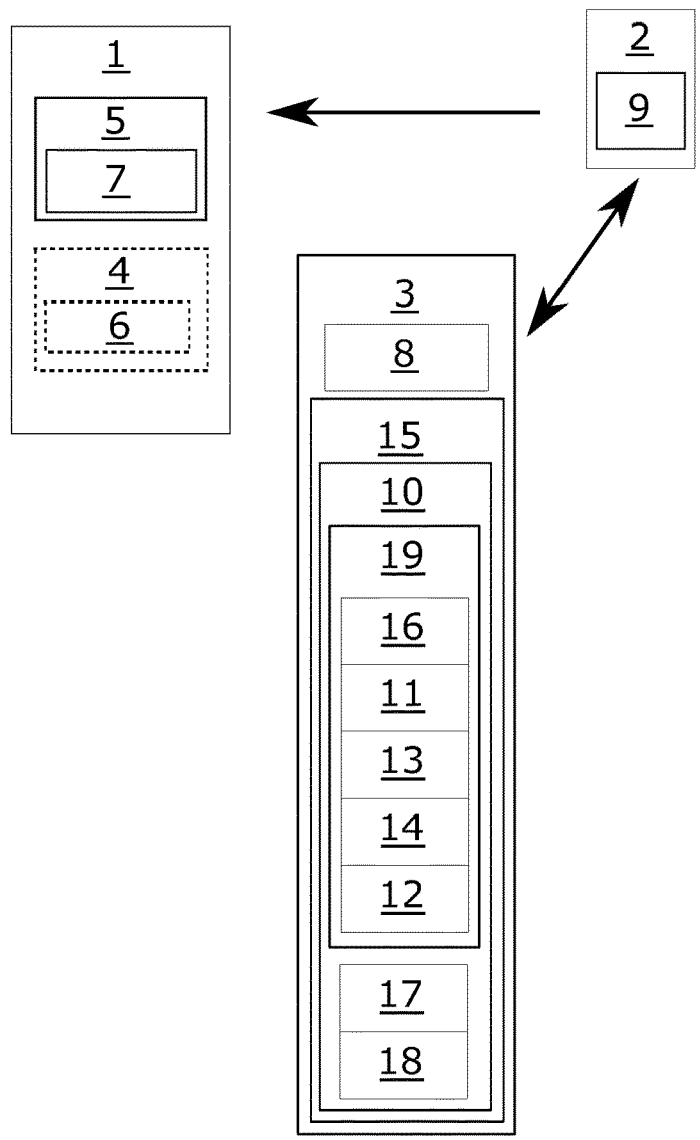
FIG. 1 shows a schematic illustration of a system according to the first aspect of the invention.

FIG. 1 shows a schematic illustration of a system according to the first aspect of the invention for identifying an article 1 and whether there is an ownership of the article 1. The system generally comprises an article 1 with a first tagging device 4 embedded in the article 1 and a second tagging device 5 attached to the article 1. The second tagging device 5 may in some embodiments also be embedded in the article 1. The first tagging device 4 comprises a first data set 6 stored thereon and the second tagging device 5 comprises a second data set 7 stored thereon. The first data set 6 and the second data set 7 will be described further below.

The system has at least one reading device 2 configured to read at least one of the first tagging device 4 and the second tagging device 5. A second transmitting/receiving device 9 is associated with the reading device 2 and is configured to transmit data to and receive data from a first transmitting/receiving device 8 of a central data processing device 3. The reading device 2 thus forms or houses a portal enabling access to the central data processing device 3. The reading device 2 may thus be a mobile device or a stationary device, nonlimiting examples including a RFID scanner, a mobile or a stationary scanner, a mobile telephone, a laptop computer, a tablet computer or the like, which forms the said portal or houses, e.g., an app or the like forming the portal.

The first transmitting/receiving device 8 is comprised within a data processing device 3 which is central or remote relative to at least the article 1, but preferably also relative to the reading device 2. The data processing device 3 comprises a storage device 15 with a central database 10 stored thereon.

The central database 10 comprises a virtual identity (virtual ID) 19. The virtual ID 19 comprises:
  at least one owner profile 16,
  a public key 11,
  an identification master (IDmaster) code 13,
  an identification slave (IDslave) code 14, and
  information 12 regarding the article 1.

The public key 11 generally works as a public key during communication within the system as well as during communication within a manufacturer's and between a manufacturer and the central database 10. The public key 11 is typically a company prefix, i.e. a suitable code, which identifies the manufacturer of the article 1, the manufacturer of the first tagging device 4 or the manager of the central database 10 as the case may be, or two or three such prefixes in case the public key 11 comprises information related to two or three of these parties. The public key 11 may be generated in accordance with the SGTIN-96 standard, or in any other suitable way. Alternatively, the public key 11 may simply comprise suitable information regarding one or more of the manufacturer of the article 1, the manufacturer of the first tagging device 4 and the manager of the central database 10.

The information 12 regarding the at least one article 1 is typically an article serial number (article S/N) but may also take any other feasible form. Other nonlimiting examples of the information 12 regarding the article 1 is information in the form of a picture of the article, a description of the article and a combination thereof. Generally, serial numbers may be generated in accordance with the SGTIN-96 standard.

Also, the central database 10 may further comprise a cross reference base linking the first data set 6, particularly the public key 11 of the first data set 6, of a first tagging device 4 to an article S/N of the article in which the first tagging device is or is to be embedded. Such a cross reference base provides for easier and more efficient product management in the production and sales chains, whereby a considerable amount of production costs may be saved.

The central database may also comprise further relevant information, such as but not limited to a product ID. In some embodiments the central database 10 is furthermore encrypted using a suitable encryption method or varying suitable encrypting methods. In some embodiments the central database 10 comprises a set of IDmaster codes 13 and/or a set of IDslave codes 14, from which an IDmaster code 13 and/or an IDslave code 14 may be selected when creating data sets 6, 7 of tagging devices 4, 5 as described further below.

Figure 2A:
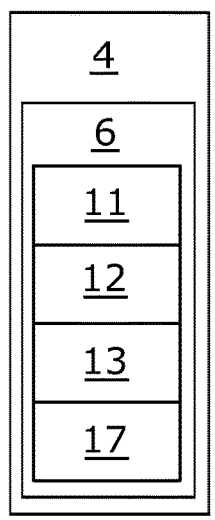
FIG. 2a shows a schematic illustration of a first tagging device of the system according to FIG. 1.

FIG. 2a shows the first tagging device 4 with the first data set 6 in further detail. The first tagging device 4 comprises a first data set 6 stored on or written to first tagging device 4, and particularly to a memory of the first tagging device 4.

The first tagging device 4 is a tagging device which may be read by a suitable reading device while held in a distance from the first tagging device 4, and thus even when the first tagging device 4 is embedded deep within an article. The first tagging device 4 is thus an RFID tag or a tag with similar properties.

The first data set 6 generally comprises at least an identification master (IDmaster) code 13. The first data set 6 may further comprise at least information 12 regarding the at least one article 1 and a public key 11.

As shown in FIG. 2a, the first data set 6 comprises the information 12 regarding the article 1, the public key 11, the IDmaster code 13 and a first tag identification (TID) 17.

The public key 11 generally works as a public key during communication within the system. The public key 11 is typically a company prefix, i.e. a suitable code, which identifies the manufacturer of the article 1, the manufacturer of the first tagging device 4 or the manager of the central database 10 as the case may be, or two or three such prefixes in case the public key 11 comprises information related to two or three of these parties. The public key 11 may alternatively simply be suitable information regarding any one or more of the at least one manufacturer of the at least one article 1, the manufacturer of the first tagging device 4 and the manager of the central database 10. The public key 11 may be generated in accordance with the SGTIN-96 standard, or in any other suitable way.

The information 12 regarding the at least one article 1 is typically an article serial number (article S/N) but may also take any other feasible form. Other nonlimiting examples of the information 12 regarding the at least one article 1 are information in the form of a picture of the article, a description of the article and a combination thereof.

The TID 17 may be a code, a tag serial number (tag S/N) or the like identifying the first tagging device 4. Generally, serial numbers may be generated in accordance with the SGTIN-96 standard.

The first data set 6 may further optionally comprise a company profile. The company profile is typically a profile of the manufacturer of the article and may so form at least a part of the suitable information regarding the manufacturer forming the public key 11. Thereby a first ownership of the article related to the company whose profile is comprised in the first data set 6 is created, such that only this company may use tags bearing its company profile. Thereby, a security against fraud in the manufacturing part of the commercial chain is ensured.

The generation of the first data set 6 will be described further below. When the first data set 6 has been stored on the first tagging device 4, the first tagging device 4 is locked in a read-only mode, in some embodiments in a permanent manner. Thereby no further information may be stored on the first tagging device.

Figure 2B:
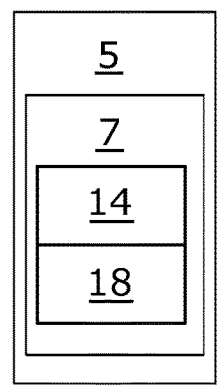
FIG. 2b shows a schematic illustration of a second tagging device of the system according to FIG. 1.

FIG. 2*b* shows the second tagging device 5 with the second data set 7 in further detail. The second tagging device 5 is a tagging device which may be read by a suitable reading device, particularly the reading device 2, while held near or in close proximity to the second tagging device 5, and thus when the second tagging device 5 is attached to or near the surface of an article 1. The second tagging device 5 may thus by way of nonlimiting examples be any one of an NFC tag, a barcode, a smart code or another tag with similar properties. The second tagging device 5 may alternatively be embedded in the at least one article and/or be an RFID tag.

The second tagging device 5 comprises a second data set 7 stored on or written to second tagging device 5, and particularly to a memory of the first tagging device 5. The second data set 7 generally only comprises the IDslave code 14 and a tag identification (TID) 18 stored thereon in the form of a code, tag serial number (tag S/N) or the like identifying the second tagging device 5. When the second data set 7 has been stored on the second tagging device 5, the second tagging device 5 is locked in a read-only mode, in some embodiments in a permanent manner. Thereby no further information may be stored on the second tagging device 5.

The TIDs 17 and 18 are generated by the manufacturer of the tagging device. Alternatively, the TIDs 17 and 18 may be generated by the central data processing device 3.

The IDmaster code 13 and the IDslave code 14 are generated by the central data processing device 3 in a process described further below.

The IDmaster code 13 and the IDslave code 14 are paired and locked to one another by the central data processing device 3 in a process described in further detail below. The process may only be initiated by an owner of both the at least one article 1 and of the virtual ID 19, and the process links the ownership of the at least one article 1 to the IDmaster code 13 and the IDslave code 14.

Generation of the Datasets

The central data processing device 3 is configured to generate both the first data set 6 and the second data set 7. Further relevant data may be retrieved externally or may be generated by the central data processing device 3. In any event all data is stored and kept track of in the central database 10.

The central data processing device 3 may be configured to generate the IDmaster codes 13 and/or the IDslave codes 14 according to need or on request.

Alternatively, the central database 10 may comprise a set of pre-generated IDmaster codes 13 and/or a set of pre-generated IDslave codes 14, and the central data processing device 3 may be configured to choose an IDmaster code 13 or an IDslave code 14 to be written onto a tagging device from the relevant set of codes when needed.

In any event, the central data processing device 3 is configured to keep track of which IDmaster codes 13 and IDslave codes 14 are in use and which are available for use.

The first data set 6 may by way of a nonlimiting example be created without following any particular standard. The first data set 6 may by way of another nonlimiting example be created following a suitable public standard, such as but not limited to the SGTIN-96 standard, and/or comprise data regarding the article in accordance with a suitable public standard, such as but not limited to the GTIN13 standard. In such a case the first tagging device 4 may comprise a memory, where a part of the memory is an EPC, which is a memory part configured to contain a suitable standard, such as but not limited to the GS1 standard.

Generation of the First Data Set

Figure 3:
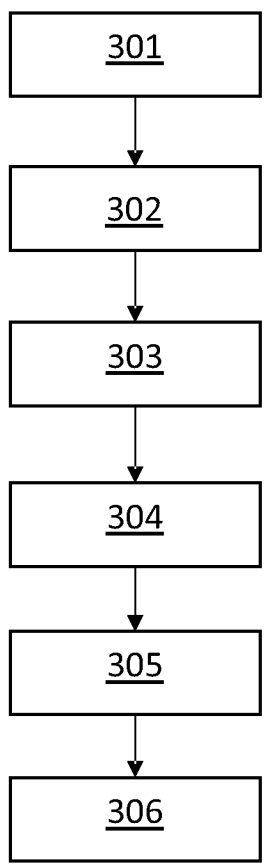
FIG. 3 illustrates the steps of generating a first data set for a first tagging device of the system according to FIG. 1.

Referring now to FIG. 3, to generate the first data set 6, the following steps are performed. Generation of a first data set 6 may be done on request from a customer, typically being a manufacturer of articles to be tagged. Alternatively, generation of a first data set 6 may be done on the own volition of an operator of the central database 10, which creates advantages of large scale operations. The ownership of the first data set 6 initially belongs to the one generating it, that is generally the manager of the central database 10. The ownership of the first data set 6 may be transferred upon sale or delivery of the first tagging device 4 with the first data set 6 stored thereon.

In step 301, an IDmaster code 13 is chosen from the central database 10 by the central data processing device 3.

In step 302, the IDmaster code 13 is locked to the virtual ID 19, and the virtual ID 19 is locked to the requesting customer, by the central data processing device 3, i.e. centrally, and the IDmaster code 13 is added to the first data set 6.

In step 303, a public key 11 and information 12 regarding the article 1 to be tagged, typically an article S/N, is added to the first data set 6 by the central data processing device 3.

In step 304, the first TID 17 is added to the first data set 6 by the central data processing device 3. The first TID 17 is created by the tagging device manufacturer.

In step 305 the first data set 6 is stored on the first tagging device 4 by the central data processing device 3.

In step 306 the first tagging device 4 is locked or burned into a read-only state. The read-only state is permanent. This may be done for instance by means of a method called Permalock. Step 306 may be performed by the tagging device manufacturer or by the manager of the central database 10.

Finally, the first tagging device 4 is embedded into the article 1 to be tagged, typically by the manufacturer.

In this way it is ensured that when a user scans or reads the first tagging device, only the original data, i.e. the first data set will be revealed. Thus, information regarding the owner and ownership as well as ownership history, will not be revealed, and the owner will thus remain anonymous.

Generation of the Second Data Set

Figure 4:
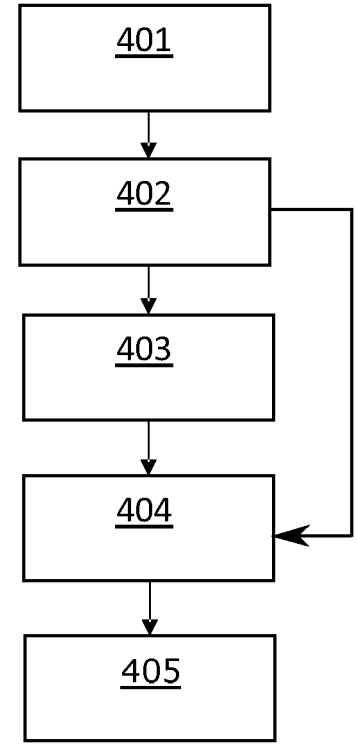
FIG. 4 illustrates the steps of generating a second data set for a second tagging device of the system according to FIG. 1.

Referring now to FIG. 4, to generate the second data set 7, the following steps are performed. Generation of a second data set 7 may be done on request from a customer or user, typically being either a manufacturer of articles to be tagged or a consumer or another subsequent owner of the article.

In step 401, an IDslave code 14 is chosen from the central database 10 by the central data processing device 3 and the IDslave code 14 is added to the second data set 7.

In step 402, the second TID 18 is added to the second data set 7 by the central data processing device 3. The second TID 18 is created by the tagging device manufacturer.

In an additional step 403, additional relevant information may be added to the second data set 7 by the central data processing device 3.

In step 404 the second data set 7 is stored on the second tagging device 5 by the central data processing device 3.

In step 405 the second tagging device 5 is locked or burned into a read-only state. The read-only state may be permanent. This may be done for instance by means of a method called Permalock. Step 405 may be performed by the tagging device manufacturer or by the manager of the central database 10.

Finally, the second tagging device 5 is attached to or embedded into the article 1 to be tagged, typically by the requesting party or user.

Figure 10:
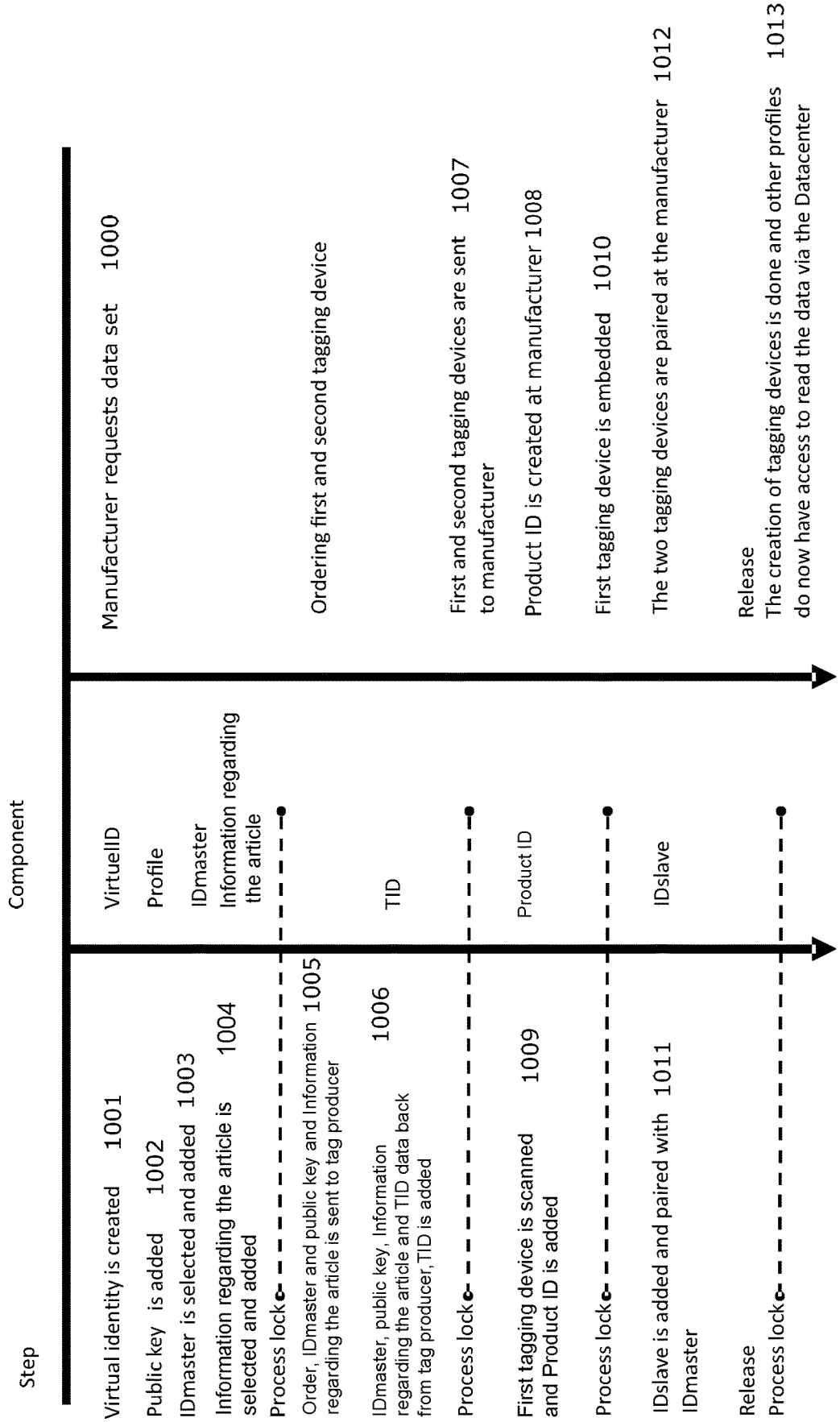
FIG. 10 shows a further illustration of the steps of generating a first data set for a first tagging device of the system according to FIG. 1 and the steps of pairing a first tagging device and a second tagging device of the system according to FIG. 1.
Figure 11:
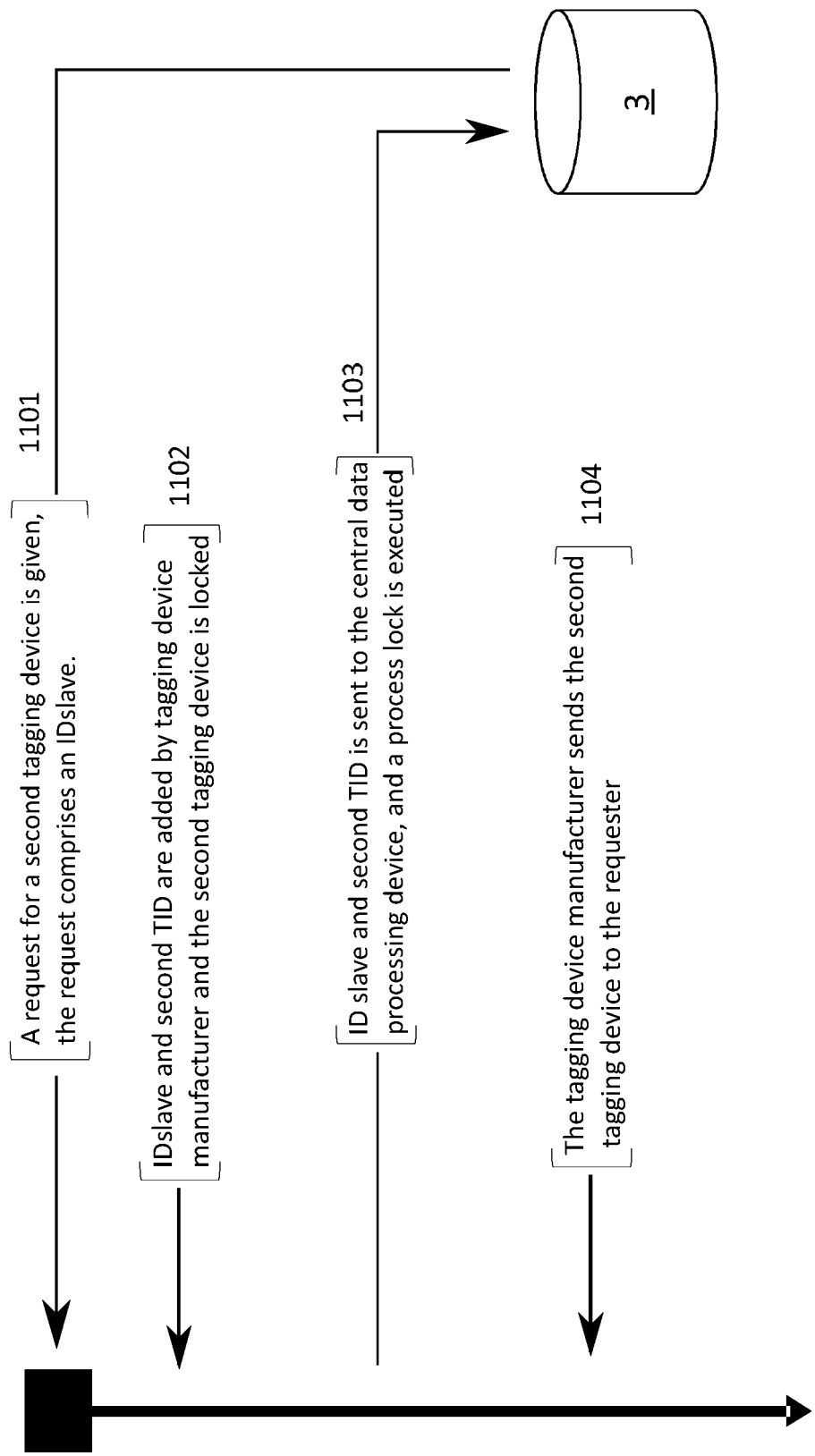
FIG. 11 shows a further illustration of the steps of generating a second data set for a second tagging device of the system according to FIG. 1.

Referring now to FIGS. 10 and 11, respectively, alternative and/or additional steps used to generate the first data set 6 and the second data set 7, respectively, will be described in more detail. FIGS. 10 and 11 should each be read from the top and vertically downwards.

As illustrated on FIG. 10, a user—here a manufacturer—in a first step 1000 requests from the central data processing device 3 a data set. Alternatively, in step 1000, an operator of the central database 10 requests from the central data processing device 3 a data set.

In reply to receiving said request, the central data processing device 3 1001) creates a virtual identity (virtual ID) 19 for the requester, 1002) adds thereto a public key 11 and an owner profile with an associated ownership, 1003) selects and adds an IDmaster code 13, and 1004) selects and adds information 12 regarding the article. The public key 11 is created based on details received by the central data processing device 3 with the request sent in step 1000. Subsequently, the already performed part of the process is locked (cf. "Process lock").

Next, in a sixth step 1005 the central data processing device 3 orders a first tagging device 4 at a tagging device manufacturer. Thus, the central data processing device 3 sends to the tagging device manufacturer an order comprising the selected IDmaster code 13, the public key 11 and the information 12 regarding the article. The selected IDmaster code 13, the public key 11 and the information 12 regarding the article are added to the first tagging device 4, which is subsequently locked or burned into a permanent read-only state.

The tagging device manufacturer responds in a seventh step 1006 by sending back to the central data processing device the selected IDmaster code 13, public key 11 and the information 12 regarding the article together with Tagging Device ID (TID) data.

The tagging device manufacturer further, in an eighth step 1007, sends a first tagging device 4 comprising the selected IDmaster code 13, public key 11, the information 12 regarding the article and Tagging Device ID (TID) data to the manufacturer who ordered the tagging device. Subsequently, the already performed part of the process is locked (cf. "Process lock").

In step 1008 the manufacturer then creates a product ID for the article 1 to be tagged. The product ID may be newly created at this point, or alternatively an already existing product code or item number may be used.

In step 1009 the manufacturer scans the first tagging device and communicates the product ID to the central data processing device 3. The central data processing device 3 subsequently stores the product ID in the central database 10.

In step 1010, the manufacturer embeds the first tagging device 4 in the article 1 to be tagged, thus tagging the article 1. Subsequently, the already performed part of the process is locked (cf. "Process lock").

Referring now to FIG. 11, the second data set 7 is created in reply to receiving an order in step 1101 of FIG. 11 by performing the following steps.

In a first step 1101, the central data processing device 3 orders a second tagging device 5 at a tagging device manufacturer, the order being made based on a request from a manufacturer, the order comprising an IDslave 14 selected by the central data processing device 3 from the central database 10.

In a second step 1102, the tagging device manufacturer codes the memory of the second tagging device 5 with the received IDslave 14 and a second tagging ID (TID) 18 and locks or burns the second tagging device 5 into a permanent read-only state.

In a third step 1103, the tagging device manufacturer sends the second TID 18 and the IDslave 14 to the central data processing device 3, which saves it in the central database 10. Subsequently, the already performed part of the process is locked (cf. "Process lock").

Finally, in a fourth step 1104, the tagging device manufacturer sends the second tagging device 5 with the second data set 7 to the requester who made the request in step 1101 of FIG. 11.

Referring again to FIG. 10, in step 1011, the manufacturer scans the second tagging device 5 and communicates with the central data processing device 3. In step 1012, the manufacturer performs pairing of the first and second tagging devices 4 and 5 as described below in relation to FIG. 5. Subsequently, the already performed part of the process is locked (cf. "Process lock").

Finally, in step 1013, the creation of the first and second tagging devices 4 and 5 is complete, and the first and second tagging devices 4 and 5 are released such that other users now are granted access to read the first and second tagging devices 4 and 5 via the central data processing device 3.

Pairing a First Tagging Device and a Second Tagging Device

Figure 5:
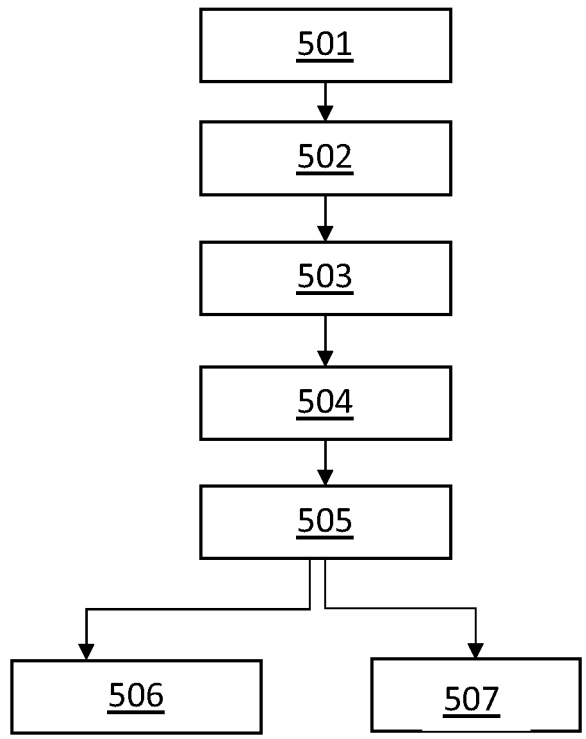
FIG. 5 illustrates the steps of pairing a first tagging device and a second tagging device of the system according to FIG. 1.

Referring now to FIG. 5, when an article has been tagged with both a first tagging device 4 and a second tagging device 5, the two tagging devices 4 and 5 need to be paired. To pair the first tagging device 4 and the second tagging device 5, pairing data is necessary. In effect the pairing data consists of the IDmaster code 13, which the user has already received with (stored on) the first tagging device 4, and the IDslave code 14, which the user has already received with (stored on) the second tagging device 5.

The use of additional pairing data may also be envisaged in order to add a further layer of security. For instance, it may be necessary to also involve a party capable of confirming the authenticity of the article and/or that the current owner is in fact the owner of the article, such a party typically being an insurance company having ensured the article. Such additional pairing data may thus be a confirmation of the authenticity of the article and/or that the current owner is in fact the owner of the article from, for instance, an insurance company. Such a confirmation—or other additional pairing data—may be sent by the current owner on his own volition or may be requested by the central data processing device 3. It is also feasible to involve a party capable of confirming the authenticity of the article and/or that the current owner is in fact the owner of the article already in connection with the receipt of an order for a number of tagging devices or during creation of the first and second data sets. In another example, the tagging device manufacturer or the manager of the central database 10 may dedicate tagging devices to the party ordering the tagging devices in such a manner, that only the party ordering the tagging devices may perform pairing. If this is done, additional pairing data in the form of a confirmation of the identity of the party attempting to pair a first and a second tagging device 4, 5 will be needed. In any event, a further level of security and protection against fraud is thereby provided.

The pairing of the first tagging device 4 and the second tagging device 5 is then made by performing the following steps.

In step 501, the user scans the first tagging device 4 by means of the reading device 2 or another reading device suitable to read a RFID type tagging device.

In step 502, the user scans the second tagging device 5 by means of the reading device 2.

In step 503, the user sends the scanned data, that is in effect the IDmaster code 13 and the IDslave code 14, to the central data processing device 3 by means of the second transmitting/receiving device 9 and/or by means of a transmitting/receiving device of the other reading device suitable to read a RFID type tagging device. Where necessary, step 503 may also involve sending a confirmation of the authenticity of the article and/or that the current owner is in fact the owner of the article retrieved from, for instance, an insurance company to the central data processing device 3.

In step 504 the central data processing device 3, upon receiving the IDmaster code 13 and the IDslave code 14, compares the IDmaster code 13 and the IDslave code 14 received with one another and with the data saved in the central database 10.

In step 505, if the step of comparing confirms that the IDmaster code 13 and the IDslave code 14 are a match, the central data processing device 3 registers the first and second tagging device 4 and 5 in the central database 10 as a pair, and confirms the match to the user.

The first and second tagging device 4 and 5 is then, in step 506, paired by in practice coupling gateways of the first and second tagging devices 4 and 5 to one another.

Alternatively, if the step 505 of comparing shows that the IDmaster code 13 and the IDslave code 14 are not a match, this is in step 507 communicated to the user, and the pairing process is terminated.

The pairing may comprise a further step of subtracting (or adding depending on the initial setting of the counter) one to a counter comprised in the central data processing device 3 and configured to keep track of the number of pairings performed in relation to a given batch of tagging devices 4 and 5 ordered. Thereby it may be ensured that no more than a maximum of pairings corresponding to the number of pairs of first tagging devices 4 and second tagging devices 5 ordered with a request received in step 1000 of FIG. 10 is possible. Thereby, fraud and errors in connection with the tagging devices is prevented. A further advantage is that such a counter enables at a later point linking particular products (tagging devices or articles 1) to a particular production order.

The initial setting of such a counter may be obtained as follows. A code, such as a bar code or a smart code, is created on the request or order for tagging devices. The code comprises a production order ID and the product ID of the requester, the production order ID comprising information regarding the number of tagging devices ordered. The code is scanned by means of a suitable scanner and the obtained production order ID and product ID of the requester, and thus information regarding the number of tagging devices ordered, is sent to the central data processing device 3. The central data processing device 3 sets the counter in accordance with the received information. When the counter reaches zero (or the number of tagging devices ordered depending on the initial setting of the counter) further pairing attempts related to the same production order ID are rejected.

Identifying an Article and an Ownership of an Article

Figure 6:
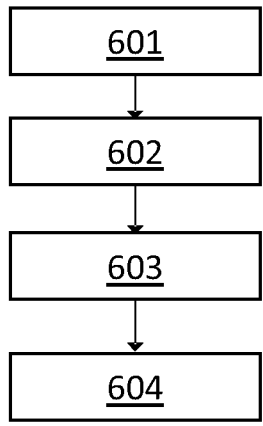
FIG. 6 shows an illustration of a method according to the second aspect of the invention.

Referring now to FIG. 6, a method for identifying an article 1 and whether there is an ownership of the article 1 according to the second aspect of the invention will now be described. The method comprises the following steps.

In step 601, a system according to the first aspect and as described above in relation to FIGS. 1 to 2*b* is provided.

In step 602, at least one of the first tagging device 4 and the second tagging device 5 is scanned. This may for the second tagging device 5 be done using the at least one reading device 2 or any other suitable reading device. For the first tagging device 4, this may be done using an RFID reader or any other suitable reading device.

In step 603, information stored in the central database 10 regarding the article 1 and regarding an ownership of the article 1 is obtained from the central database 10 of the central data processing device 3. In practice this is done by means of electronic communication between the at least one reading device 2, or any other suitable reading device, and the central data processing device 3.

In step 604, obtained information regarding the article 1 is displayed. In case the user scanning at least one of the first and second tagging devices 4 and 5 in step 602 is the current owner of the article 1, and this user is logged into his user profile in the central database 10, the ownership of the article 1 is also displayed. This may be done on a display of the at least one reading device 2, or any other suitable display connected to the reading device 2 or comprised by or connected to any other suitable reading device. Thereby, the article 1 and whether there is an ownership of the article 1 is identified to the user of the reading device and display.

In the below further methods and steps thereof are disclosed. These methods may all form part of a method according to the second aspect of the invention. Likewise, the system according to the first aspect of the invention, and more particularly the relevant parts thereof, may be configured to carry out any one or more steps of any method according to the second aspect of the invention. Particularly, the system according to the first aspect of the invention may at least be configured to carry out a method of the type described in connection with FIG. 6 above.

Transferring the Ownership of an Article

In the following, the steps in various examples of a process for transferring the ownership of an article 1 within a system according to the invention will be described referring to FIGS. 7 to 9. The process for transferring the ownership of an article 1 will be used between users such as manufacturers, retailers, insurance agents and consumers according to need. As will be clear the process according to the invention for transferring the ownership of an article 1 is a very simple process to perform for the various users, while also being very safe and having a high degree of recognisability from other uses of the system according to the invention. Furthermore, this process guarantees the anonymity of the owner, whether present or future, at any time.

It is important to note that generally, a transfer of an ownership of an article can exclusively be initiated by the current owner of the article, and never by the future owner, or owner to be, of the article. Also, it is presupposed that both the first user and the second user has a profile in the central database and are logged in to this profile. Furthermore, it may be necessary to also involve a party capable of confirming the authenticity of the article and/or that the current owner is in fact the owner of the article, such a party typically being an insurance company having ensured the article. These aspects ensure a further level of security of the ownership transfer process.

Generally, the ownership transfer process takes place in an app or another suitable program, through which the communication between the users and the central data processing unit 3 may take place.

Ownership Transfer Process—Embodiment 1

Figure 7:
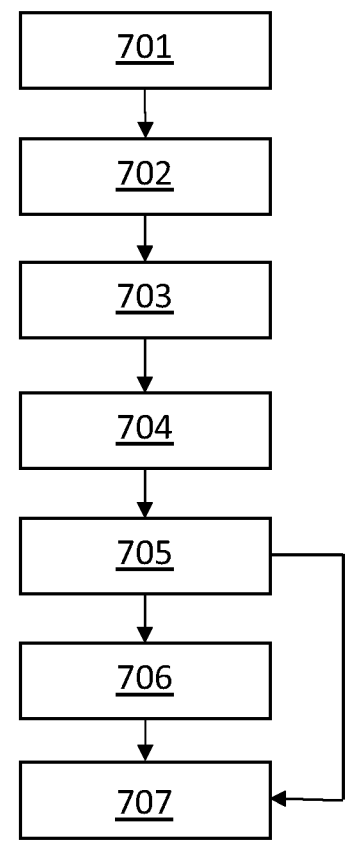
FIG. 7 shows a diagram illustrating a transfer of an ownership according to a first embodiment of a method according to the second aspect of the invention.

Referring first to FIG. 7, in a first embodiment, being the simplest form of an ownership transfer process, the transfer of an ownership of an article 1 takes place by, within a system according to the first aspect of the invention, performing the following steps.

In step 701, a transfer of an ownership of an article 1 from the first user to the second user is initiated, by providing the first user with an ownership transfer ID (identification). More particularly, the second user provides to the first user an ownership transfer ID. To this end the second user may use a suitable transmitting/receiving device, herein also denoted third transmitting/receiving device. The ownership transfer ID is typically an ID identifying the second user as a profile in the central database and may be used in combination with a transfer reference. The ownership transfer ID may be a number or in a form which is suitable to be scanned or received by a transmitting/receiving device e.g. by a QR scanner or by Bluetooth. The ownership transfer ID may be scanned, received, or typed in by a first user. The first user opens an ownership transfer request by use of the data processing unit and sends the ownership transfer ID to the remote data processing unit 3, together with information such as a transfer reference. All users may have a fixed transfer ID associated with the user's owner profile.

The ownership transfer request may comprise, or by the central data processing device 3 be provided with, a timer set to a predetermined time interval, such as a predetermined number of minutes. When the predetermined time interval is lapsed and the ownership transfer ID, and if included in the request from the first user the transfer reference, has not been activated, the ownership transfer request expires and can no longer be activated according to the below described steps. Also, the first user may choose to cancel at any time during the ownership transfer process.

In step 702, If the ownership transfer ID was typed in by the first user the central data processing unit 3 requests the second user to send, by means of the third transmitting/receiving device, the transfer reference, thereby activating the ownership transfer ID.

If the first user scans or receives the ownership transfer ID, the central data processing unit 3 requests the second user to accept the creation of a transfer, thereby activating the ownership transfer ID. The central data processing unit 3 may then perform a validation of the ownership transfer ID and transfer reference received from the first user and the transfer reference received from the second user, to ensure that the ownership transfer procedure is continued by the correct users.

In step 703, the first user receives from the remote data processing unit 3 an activation message signifying that the ownership transfer ID has been activated. The first user subsequently sends to the remote data processing unit 3 a reply accepting the activation of the ownership transfer ID, thus creating a virtual connection between the first user and the second user through the remote data processing unit 3. The virtual connection is in the following used as a virtual space in which the users may transfer the ownership of the article 1. The virtual connection may be provided with a limited life time. The virtual connection may thus comprise a timer set to a predetermined time interval, such as a predetermined number of minutes. When the predetermined time interval is lapsed, the virtual connection is terminated.

Subsequently, the ownership transfer process continues in step 704, where the first user a) scans the second tagging device 5 of the article 1, where the scanning may be made using the at least one reading device 2,
b) sends to the remote data processing unit 3 a request for releasing the ownership of the article 1, said request comprising the identification slave (IDslave) code 14, where the sending may be made using the second transmitting/receiving device 9, and
c) sends, by means of the second transmitting/receiving device 9, to the remote data processing unit 3 an ownership transfer message confirming the transfer of the ownership of the article 1. The said ownership transfer message comprises the identification slave (IDslave) code 14.

In step 705, the second user receives from the remote data processing unit 3 a confirmation request, and in reply to the confirmation request received sends to the remote data processing unit 3 a confirmation message confirming or denying transfer of the ownership of the article 1. The confirmation message may comprise the identification slave (IDslave) code 14, which then acts as an extra security key to ensure the ownership of the correct article 1 is transferred.

In a further, optional, step 706, the first user receives from the remote data processing unit 3 a confirmation message confirming completion of the transfer of the ownership of the article 1.

Finally, the process may in step 707 be concluded in that the first user shuts down the virtual connection.

It is noted that alternatively the above described parts a) and b) of step 704 may in principle be performed first as an initiation of the ownership transfer procedure. In this case the central data processing device 3 responds to the receipt of a request for releasing the ownership of the article 1 sent in b) of step 704 as described above by sending to the first user an ownership transfer request. The procedure then continues as described above with steps 701, 702 and 703, further with part c) of step 704, and finally with steps 705 to 707.

Ownership Transfer Process—Embodiment 2

Figures 8, 9:
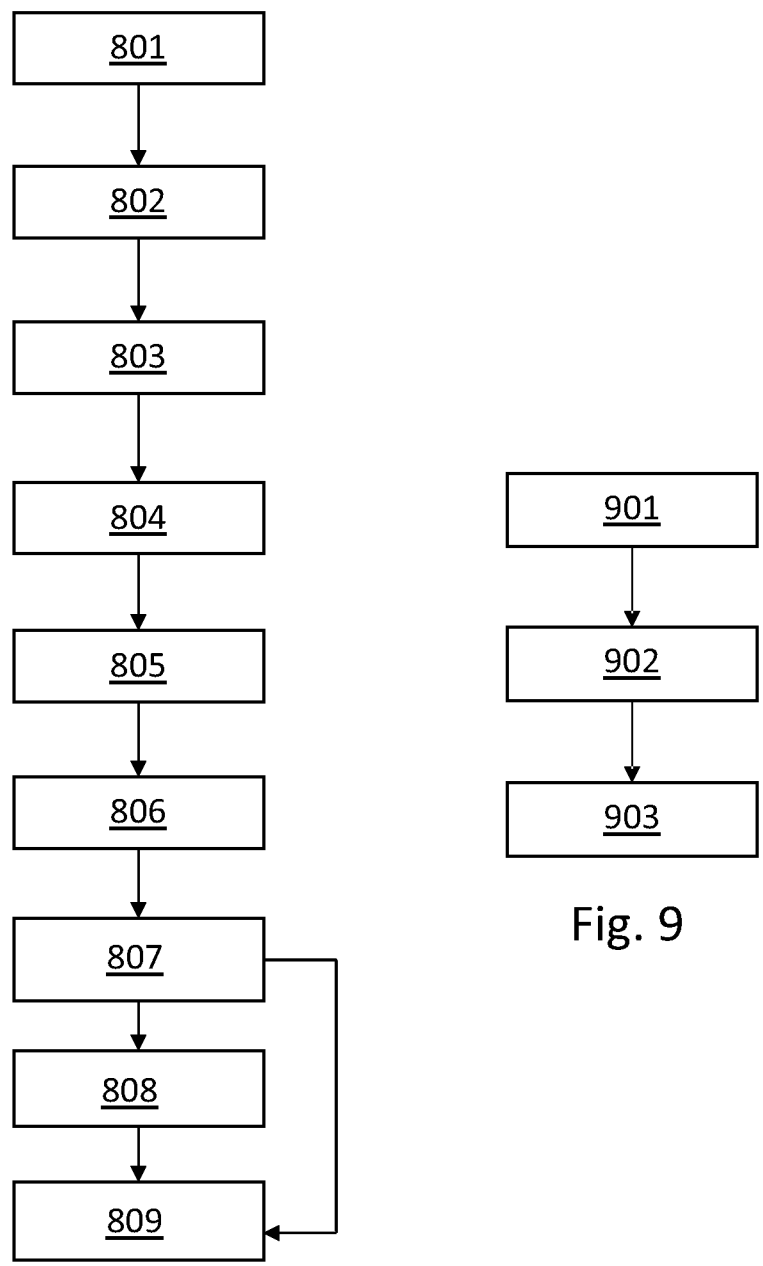
FIG. 8 shows a diagram illustrating a transfer of an ownership according to a second embodiment of a method according to the second aspect of the invention.
FIG. 9 shows a diagram illustrating a transfer of an ownership according to a third embodiment of a method according to the second aspect of the invention.

Referring now to FIG. 8, in a second embodiment, the transfer of an ownership of multiple articles takes place by, within a system according to the first aspect of the invention, performing the following steps.

In steps 801 to 803, the first user and the second user follows the same procedure as that described for steps 701 to 703 above.

Next, in step 804, the first user chooses the articles whose ownership is to be transferred to the second user, and confirms the choices made. The choice may be made from a list of articles owned by the first user and registered in the central database, or by scanning the second tagging device of each article, where the scanning may be made by using the first reading device 2.

In case the second user has placed an order at the first user and thus has received an order identification number, this order identification number may be used as an extra security key to confirm the list of articles whose ownership is to be transferred. Thereby, an extra level of security is added to the process. In this case, a series of optional steps are performed prior to the below steps, this series of steps comprising: the remote data processing unit 3 requesting the first user to provide the order identification number, the first user sending the order identification number to the remote data processing unit 3, and these two steps being repeated once.

Next, in step 805, the first user and the second user follows the same procedure as that described for step 705 above.

In step 806, to be performed only in case step 804 comprises scanning the second tagging device of each of the articles whose ownership is to be transferred, the second user confirms or rejects for each article the result of the scanning.

In step 807, to be performed only in case step 806 is performed, the first user receives from the remote data processing unit 3 for each article scanned by the second user a confirmation request.

In a further, optional, step 808, the first user receives from the remote data processing unit 3 a confirmation message confirming completion of the transfer of the ownership of the article.

Finally, the process may in step 809 be concluded by the first user and the second user each receiving a transfer complete message and the virtual connection being shut down.

It is noted that alternatively the above described steps 804 and 805 may in principle be performed first as an initiation of the ownership transfer procedure. In this case the central data processing device 3 responds to the receipt of a request for releasing the ownership of the article 1 sent in step 805 as described above by sending to the first user an ownership transfer ID. The procedure then continues as described above with steps 801, 802 and 803, and further with part steps 806 to 809.

Ownership Transfer Forwarding Process—Embodiment 3

Referring finally to FIG. 9, in another embodiment of an ownership transfer process, the first user is a manufacturer and the second user is a reseller or dealer, and the reseller or dealer is approved as reseller or dealer by the manufacturer and registered as such in the central database 10 of the remote data processing unit 3. In this embodiment, the transfer of an ownership of one or multiple articles takes place by, within a system according to the first aspect of the invention, performing the following steps.

In step 901, the first user, i.e. the manufacturer, sends, by means of a third transmitting/receiving device, an ownership transfer ID according to steps 701 to 703 to the second user, i.e. the reseller or dealer. Thereby a virtual connection or space is formed.

In step 902, the second user chooses from a list of available articles some or all the products whose ownership is to be transferred. Here the second user also chooses if he is to assume ownership himself of an article or if he is to forward the ownership, i.e. perform a transfer forwarding. In the case of a transfer forwarding the second user does not obtain ownership of an article but only acts as an intermediary between the first user, e.g. a manufacturer, and a third user, e.g. a customer. The list of available articles may be provided by the central data processing device 3 and may be shown on a display associated with the third transmitting/receiving device.

Subsequently, in step 903, if multiple articles are chosen for either forwarding or to assume ownership the process follows the steps 801 to 809 performed according to the second embodiment of the ownership transfer process described above, or If one article is chosen the process follows the steps 701 to 706 performed according to the first embodiment of the ownership transfer process described above, in both further processes the second user assumes the role as a first user and the third user assumes the role of the second user.

In any of the above embodiments, the ownership transfer process may commence with three steps performed previously to the above steps. In an initial and optional step, a first user, the present owner of the article, and a second user, the future owner of the article, make a mutual judicial agreement—oral or written—to transfer one or more articles from the first user to the second user.

In a subsequent step, the first user logs in to the central database 10 via an interface or a portal with the remote data processing unit 3 and initiates the ownership transfer process as described above through a functionality on the interface. Such an interface may for instance be provided in an app provided on a mobile telephone, tablet computer, laptop computer or the like. It may furthermore be provided, that the functionality enabling initiating an ownership transfer process is only available to a user, provided the user actually has at least one ownership registered in the central database 10.

In a further subsequent step, the first user chooses an ownership transfer process to be used amongst, e.g., the above described possibilities.

Also, in any of the above embodiments, the ownership transfer process may be repeated for one or more further articles.

The owner (manufacturer, (re)seller, buyer, customer . . . ) may also set a status of an ownership by sending relevant information to the remote data processing unit 3. Such information may for instance set the status of the ownership to "stolen" or "lost", thereby indicating that the associated article has been stolen or lost.

It may also be envisaged that an article may be co-owned, i.e. have more than one owner. In such a case any of the above ownership transfer processes may include that the actions or steps performed by the first user is repeated for each co-owner that desires to transfer his ownership.

Also, in case that an article is co-owned, i.e. has more than one owner, relevant information relating each co-ownership may be stored in the central data storage. It may then also be envisaged that the process of pairing the IDmaster code and the IDslave codes and thus the first and second tagging device is only completed upon each co-owner having performed the necessary actions.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A system for identifying an article and whether there is an ownership of the article, the system comprising:
   at least one article comprising a first tagging device embedded in the at least one article and a second tagging device embedded in or attached to the at least one article,
   at least one reading device configured to read at least one of the first tagging device and the second tagging device, a central data processing device comprising a storage device with a central database stored thereon and a first transmitting/receiving device, and a second transmitting/receiving device associated with the at least one reading device and configured to transmit data to and receive data from the at least one reading device and the first transmitting/receiving device, wherein the central database at least comprises: at least one virtual identity (virtual ID), the at least one virtual ID comprising information regarding the article, wherein the virtual ID further comprises an owner profile, a public key, an identification master (IDmaster) code, and an identification slave (IDslave) code, the owner profile-comprising information regarding an ownership of the article, wherein the virtual ID is a data set, which construes the virtual identity of the article, and which is stored in the central database, wherein the public key is a code used during communication with or within the system, the public key identifying any one of: the manufacturer of the article, the manufacturer of the first tagging device and the manager of the central database, wherein the IDmaster code and the IDslave code are generated by the central data processing device, wherein the first tagging device comprises a first data set stored thereon, the first data set comprising at least: the information regarding the at least one article, the public key, a first tag identification TID) and the identification master (IDmaster) code, the first tagging device being locked in a read-only mode, wherein the second tagging device comprises a second data set stored thereon, the second data set comprising at least a second tag identification (TID) and the IDslave code, the second tagging device being locked in a read-only mode, wherein the IDmaster code and the IDslave code are paired and locked to one another by the central data processing device in a process, which may only be initiated by an owner of both the virtual ID and the at least one article, and which links the ownership of the at least one article to the IDmaster code and the IDslave code, wherein the ownership denotes the relation between the article comprising the first tagging device with the first data set and the second tagging device with the second data set and an owner of this article, and wherein the first tagging device and the second tagging device are paired by coupling a gateway of the first tagging device and a gateway of the second tagging device to the virtual ID stored in the central database.

2. A system according to claim 1, the system comprising a plurality of articles, each article of said plurality of articles comprising a first tagging device embedded in the article and a second tagging device embedded in or attached to the article, wherein, for each article of said plurality of articles:

the central database at least comprises: at least one virtual ID, the at least one virtual ID comprising an owner profile, a public key, an identification master (IDmaster) code, an identification slave (IDslave) code and information regarding the article, the owner profile comprising information regarding an ownership of the article, the IDmaster code and the IDslave code are generated by the central data processing device, the first tagging device comprises a first data set stored thereon, the first data set comprising at least: the information regarding the at least one article, the public key, a first tag identification (TID) and the identification master (IDmaster) code, the first tagging device being locked in a read-only mode, the second tagging device comprises a second data set stored thereon, the second data set comprising at least: a second tag identification (TID) and the IDslave code, the second tagging device being locked in a read-only mode, and the IDmaster code and the IDslave code are paired and locked to one another by the central data processing device in a process initiated by an owner of both the virtual ID and the at least one article and linking the ownership of the at least one article to the IDmaster code and the IDslave code.

3. A system according to claim 1, wherein only the owner of both the at least one article, or an article of said plurality of articles, and the virtual ID may initiate transfer of the ownership of that article to a second entity, wherein such a transfer is initiated by scanning the first tagging device or the second tagging device by means of the at least one reading device and sending data comprising the IDslave code or the IDmaster code and a request to start a process for transferring the ownership to the central data processing device by means of the second transmitting/receiving device.

4. A system according to claim 1, wherein information regarding an ownership of the at least one article, or of said plurality of articles, is written only in the central database.

5. A system according to claim 1, wherein the central data processing device is controlled and operated by a central operator.

6. A system according to claim 1, wherein the first tagging device is locked in a read-only mode prior to being embedded in the article.

7. A system according to claim 1, wherein at least one of the IDslave code and the IDmaster code is configured to function as a password to access information stored in the central database regarding the associated article on an access level depending on the user's relationship to the associated article.

8. A system according to claim 1, wherein the first tagging device is a RFID tag and the second tagging device is a NFC tag.

9. A system according to claim 1, wherein the at least one reading device and the second transmitting/receiving device are integrated in one and the same device.

10. A method for identifying an article and whether there is an ownership of the article, wherein the method comprises the steps of:

providing a system according to claim 1, scanning, by means of the at least one reading device, at least one of the first tagging device and the second tagging device, obtaining, from the central database, information stored in the central database regarding the article and information stored in the central database regarding an ownership of the article, and displaying the obtained information regarding the article and information regarding an ownership of the article.

11. A method according to claim 10, and further comprising initiating a transfer of the ownership of the article from a first user being both a present owner of the article and an owner of the virtual identity (virtual ID) to a second user being a future owner of the article, the initiation of a transfer comprising the following steps:

the second user providing the first user with an ownership transfer ID and the first user sending, by means of the second transmitting/receiving device, the ownership transfer ID to the remote data processing unit, the second user sending, by means of a third transmitting/receiving device, at least a part of the ownership transfer ID received from the first user or an accept to the remote data processing unit, thereby activating the ownership transfer ID, the first user receiving from the remote data processing unit an activation message signifying that the ownership transfer ID has been activated and sending to the remote data processing unit a reply accepting the activation of the ownership transfer ID, thus creating a virtual connection between the first user and the second user through the remote data processing unit.

12. A method according to claim 11, and further comprising completing the transfer of the ownership of the article, the completion of the transfer comprising the steps of:

the first user scanning, by means of the at least one reading device, the first tagging device or the second tagging device of the article, or selecting from a list of articles owned by the first user and registered in the central database the article to be transferred, the first user sending, by means of the second transmitting/receiving device, to the remote data processing unit a request for releasing the ownership of the article, said request comprising the identification slave (ID-slave) code, the second user scanning, by means of the at least one reading device, the second tagging device of the article, and sending, by means of the second transmitting/receiving device, to the remote data processing unit an ownership transfer message confirming the transfer of the ownership of the article, said confirmation message comprising the identification slave (IDslave) code, and the second user receiving from the remote data processing unit a confirmation request, and in reply to the central database sending a confirmation message confirming or denying transfer of the ownership of the article.

13. A method according to claim 12, wherein said confirmation message comprises the identification slave (ID-slave) code.

14. A method according to claim 12, and further comprising the step of the first user receiving from the remote data processing unit a confirmation message confirming completion of the transfer of the ownership.

15. A method according to claim 14, and further comprising the step of repeating the steps of:

providing a system according to claim 1, scanning, by means of the at least one reading device, at least one of the first tagging device and the second tagging device, obtaining, from the central database, information stored in the central database regarding the article and information stored in the central database regarding an ownership of the article, and displaying the obtained information regarding the article and information regarding an ownership of the article for at least one other article.

16. A system according to claim 1, wherein the central data processing device is encrypted.

17. A system according to claim 1, wherein the second tagging device is locked in a read-only mode prior to being embedded in or attached to the article.

18. A system according to claim 1, wherein the at least one reading device is an NFC scanner and the second transmitting/receiving device is a mobile telephone or a tablet or a laptop computer.

19. A system according to claim 1, wherein the at least one reading device and the first transmitting/receiving device are any one of controlled via an app and integrated in an app, the app being installed on a data processing device, such as a mobile telephone or a tablet or a laptop computer.

20. A method according to claim 15, and further comprising initiating a transfer of the ownership of the at least one other article from a first user being both a present owner of the at least one other article and an owner of the virtual identity (virtual ID) to a second user being a future owner of the at least one other article, the initiation of a transfer comprising the following steps:

the second user providing the first user with an ownership transfer ID and the first user sending, by means of the second transmitting/receiving device, the ownership transfer ID to the remote data processing unit, the second user sending, by means of a third transmitting/receiving device, at least a part of the ownership transfer ID received from the first user or an accept to the remote data processing unit, thereby activating the ownership transfer ID, the first user receiving from the remote data processing unit an activation message signifying that the ownership transfer ID has been activated and sending to the remote data processing unit a reply accepting the activation of the ownership transfer ID, thus creating a virtual connection between the first user and the second user through the remote data processing unit.

* * * * *